Sept. 5, 1967                      R. B. BENDER                         3,340,336
                              METHOD OF PLUGGING PIPE
                               Filed July 13, 1964

RICHARD B. BENDER
INVENTOR.
BY Herbert J. Brown
ATTORNEY 3,340,336
METHOD OF PLUGGING PIPE
Richard B. Bender, P.O. Box 11302,
Fort Worth, Tex. 76109
Filed July 13, 1964, Ser. No. 382,088
3 Claims. (Cl. 264—45)

ABSTRACT OF THE DISCLOSURE

A method for plugging a horizontal pipe, such as an abandoned service line, inwardly of an open end thereof, and which method consists of the steps of mixing foam generating resins which harden after being mixed in a container having a closed end and a removable end cover; sliding the container with the cover in place to the location in the pipe to be plugged, and allowing the resin to expand and harden within the pipe.

---

This invention relates to plugging pipe with plastic foam, and is a continuation-in-part of my copending application, Ser. No. 363,763, filed Apr. 30, 1964, now Patent No. 3,310,615, issued Mar. 21, 1967. The parent application is directed to a method of generating a plastic foam in a pipe near an opening through which a mixture is received for plugging the pipe. The primary object of the present invention is to provide a method for plugging a pipe at a location remote from the opening through which the mixture is received, for example, plugging two ends of an abandoned service line without digging through paving to reach the end of the line where it is connected with a main.

Other objects will become apparent from the following description and the accompanying drawing, wherein.

Figure 6:
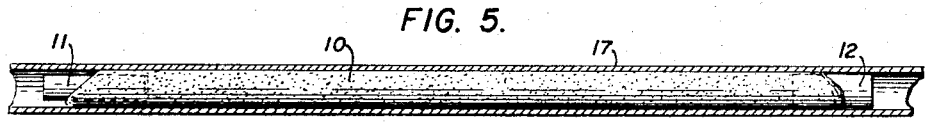
FIGURE 6 is a sectional view of the pipe shown in FIGURE 5 and illustrating the foam plug in place.

The plug 10, shown only in FIGURE 6, may be any of a combination of synthetic resins which, when mixed, form a cellular foam, preferably having good adhesive characteristics and one which will become hard within a relatively short period of time. Examples of such foams are polyurethane, epoxy, polyvinyl chloride, urea formaldehyde and others.

The vials 11 and 12 are cylindrical and have removable dispensable caps 13 and 14 for retaining liquid resins A and B during storage and transportation. The first vial 11 is less than half filled with liquid resin A and has lead balls 15 or other weights therein which serve as agitators when mixing the resins.

Figure 1:
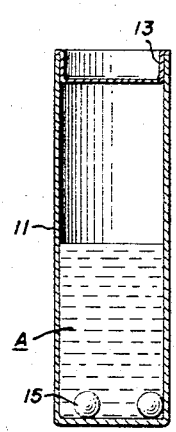
FIGURES 1 and 2 are vertical sectional views of vials containing liquid synthetic resins which, when mixed, catalyze into a cellular foam.
Figure 3:
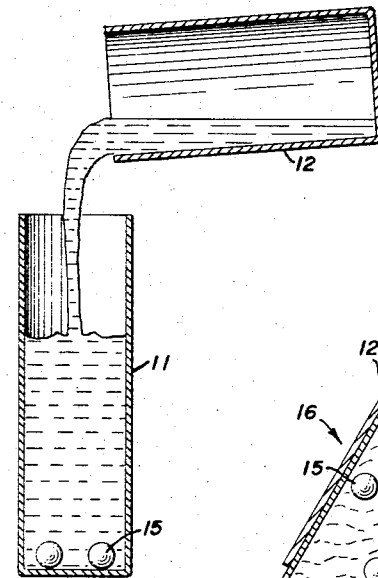
FIGURE 3 is a vertical sectional view showing the step of pouring the contents of one vial into the other.
Figure 2:
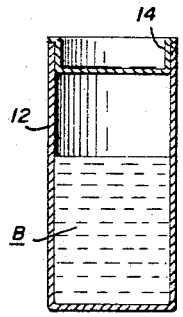
Figure 4:
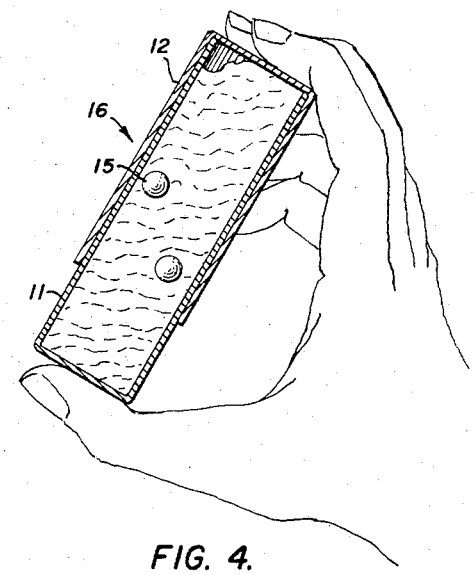
FIGURE 4 is a sectional view showing the step of mixing the contents of the two vials.
Figure 5:
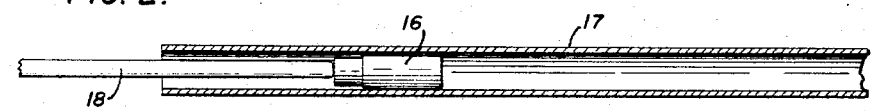
FIGURE 5 is a longitudinal sectional view of a horizontal pipe and showing the step of inserting the mixture in the pipe.

As best shown in FIGURE 4, the vials 11 and 12, which have closed ends, are slidably received, one within the other. Preferably, the diameter of the second or outer vial 12 is only slightly less than the inside diameter of the pipe 17 to be plugged. Just prior to generating the foam plug 19, the resin B of the second vial 12 is poured into the first vial 11 containing resin A, as shown in FIGURE 3, after which the second vial is positioned over the first and the contents are mixed by shaking. The mixing is enhanced by the movement of the agitators 15. The telescoped vials 11 and 12 comprise a container 16 which is quickly placed in the open end of the pipe 17 to be plugged and the container is shoved to the desired location in the pipe by means of a suitable ram 18. The ram 18 is removed quickly so as to be out of the way of the foaming action which actually starts taking place from the time of mixing, but which action is not pronounced until the container 16 is in place. The time required from mixing until the container opens depends on the kinds and amounts of resins used. As the foam expands, the container 16 separates and the vials 11 and 12 flow with the foam but act as moving plugs to slow the flow and thereby assure complete filling of the pipe 17 at a transverse dimension.

The invention herein described may be practiced in various ways within the scope of the appended claims.

What is claimed is:

1. The method of plugging a pipe, comprising the steps of mixing foam generating resins which harden after being mixed in a container having a closed end and a removable end cover; sliding the container with cover in place to the location in the pipe to be plugged, and allowing the resin to expand and harden within the pipe.

2. The method defined in claim 1 and wherein the container having a closed end and a removable end cover is comprised of two telescoping vials having closed ends.

3. The method defined in claim 1, and wherein the step of mixing said resins includes shaking said container with weighted agitators therein.

References Cited
UNITED STATES PATENTS

| | | |
|---|---|---|
| Re. 25,869 | 10/1965 | Schuermann. |
| 1,531,651 | 3/1925 | Geiger _____ 259—72 XR |
| 2,373,242 | 4/1945 | Glashow _____ 138—89 |
| 2,487,236 | 11/1949 | Greenberg. |
| 2,549,644 | 4/1951 | Silverman _____ 259—72 |
| 2,910,730 | 11/1959 | Risch _____ 264—45 |
| 2,952,129 | 9/1960 | Dempsey. |
| 3,108,404 | 10/1963 | Lamb. |
| 3,141,513 | 7/1964 | Davis _____ 166—33 XR |
| 3,156,263 | 11/1964 | Adelman _____ 138—89 |
| 3,170,516 | 2/1965 | Holland et al. ____ 166—33 XR |
| 3,251,912 | 5/1966 | Fish _____ 264—45 |

ALEXANDER H. BRODMERKEL, Primary Examiner.
P. E. ANDERSON, Assistant Examiner.